(12) United States Patent
Friestad et al.

(10) Patent No.: US 6,745,710 B2
(45) Date of Patent: Jun. 8, 2004

(54) DRIVE ELEMENT FOR GEARBOX OUTPUT

(75) Inventors: Michael Eric Friestad, Rock Island, IL (US); Nathan Albert Mariman, Geneseo, IL (US)

(73) Assignee: Deere & Company, Moline, IL (US)

( * ) Notice: Subject to any disclaimer, the term of this patent is extended or adjusted under 35 U.S.C. 154(b) by 77 days.

(21) Appl. No.: 10/214,969

(22) Filed: Aug. 8, 2002

(65) Prior Publication Data

US 2004/0025765 A1 Feb. 12, 2004

(51) Int. Cl.[7] ................................................. A01C 7/20
(52) U.S. Cl. ................. 111/178; 111/77; 74/13
(58) Field of Search ....................... 74/13, 14; 111/177, 111/178, 200, 170, 186–189, 73–78; 222/608, 609, 610, 271, 278, 368

(56) References Cited

U.S. PATENT DOCUMENTS

| | | |
|---|---|---|
| 718,664 A | 1/1903 | Shearer |
| 3,620,419 A | 11/1971 | Bailey ........................ 222/298 |
| 4,587,909 A | 5/1986 | Bailey .......................... 111/67 |
| 4,779,471 A | 10/1988 | Rettig ............................ 74/13 |
| 5,024,173 A * | 6/1991 | Deckler ..................... 111/178 |
| 6,651,569 B2 * | 11/2003 | Audigie ..................... 111/178 |

FOREIGN PATENT DOCUMENTS

| | | |
|---|---|---|
| DE | 196 34 860 A1 | 3/1997 |
| GB | 899733 | 6/1962 |

OTHER PUBLICATIONS

Elliott Manufacturing Brochure, "Flexible Rotary Power Transmission Handbook, No. 327", front and back cover including 20 pages, printed in the U.S.A., no date.

Elliott Manufacturing Brochure, "The Experienced Company with New Ideas in Power Transmission" 1 page front and back, printed in the U.S.A., no date.

Stow Manufacturing Co. Brochure, "Stow Flexible Shafts and Flexible Couplings", 9th Edition, front and back cover including 39 pages, printed in the U.S.A., no date.

* cited by examiner

Primary Examiner—Robert E. Pezzuto

(57) ABSTRACT

A gearbox is drivingly coupled to a seed meter by a drive element. The drive element comprises a drive shaft on which is mounted a multifaceted sleeve. The multifaceted sleeve is pinned to the drive shaft by a cotter pin. The cotter pin provides torque protection by defining a torque transmission limit. The multifaceted sleeve is driven by a gearbox output. The gearbox output is provided with a hexagonal opening into which the hexagonal sleeve is received. The drive shaft is provided with a drive coupling. The drive coupling comprises an annular axially extending bore having aligned transversely extending apertures passing therethrough. The drive coupling is coupled to the spindle of the seed meter. The spindle is received in the bore. A readily releasable pin extends between the drive shaft and spindle.

20 Claims, 2 Drawing Sheets

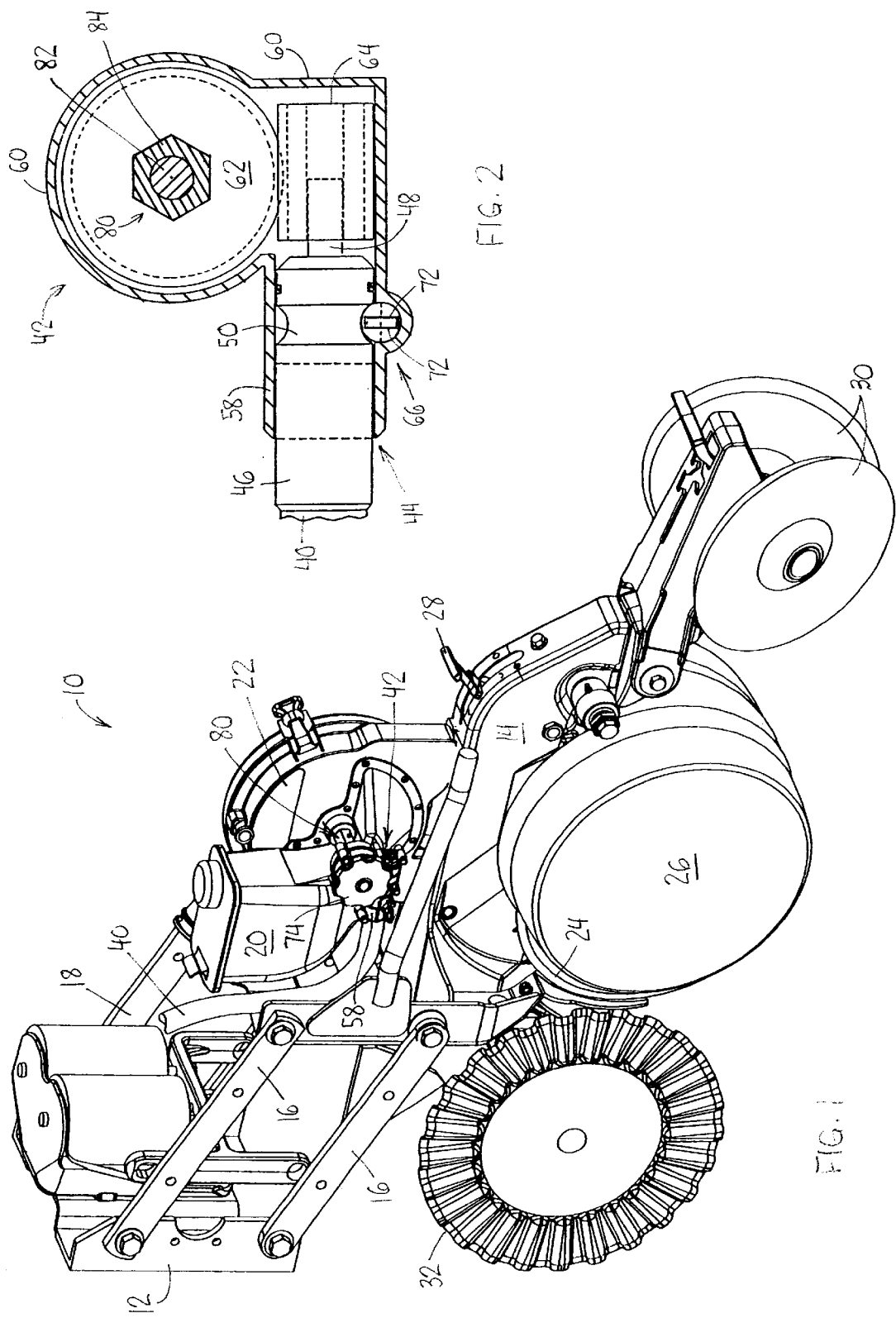

DRIVE ELEMENT FOR GEARBOX OUTPUT

FIELD OF THE INVENTION

The present invention is directed to a drive element for a gearbox output that can be readily removed from the drive line to decouple the gearbox output from a driven member.

BACKGROUND OF THE INVENTION

Flexible rotatable drive shafts have been used in a variety of applications to transmit rotational force from one location to another. Traditionally, the flexible rotatable drive shaft has a male coupling for engaging a female coupling on a gearbox. When the male coupling engages the female coupling the flexible rotatable drive shaft is in a driving relationship with the gearbox. The gearbox in turn is drivingly coupled to a driven member by a drive element. Sometimes it is necessary is disengage the drive line. One way is to decouple the flexible rotatable drive shaft from the gearbox.

Flexible rotatable drive shafts have been proposed for use on agricultural seeding machines, see U.S. Pat. Nos. 718,664, and 4,779,471.

SUMMARY

It is an object of the present invention to provide a drive element that is readily removable to decouple a gearbox output from a driven member.

The present invention allows the drive line between the flexible rotatable drive shaft and the input member of the seed meter to be decoupled without decoupling the flexible rotatable drive shaft from the gearbox. In this way the male drive portion of the flexible rotatable drive shaft is not exposed to dirt and other debris.

A gearbox driven by a flexible rotatable drive shaft is coupled to a seed meter by a drive element. The drive element comprises a drive shaft on which is mounted a multifaceted sleeve. The multifaceted sleeve is pinned to the drive shaft by a cotter pin. The cotter pin provides torque protection by defining a torque transmission limit. In the illustrated embodiment the multifaceted sleeve is a hexagonal sleeve. The hexagonal sleeve is driven by a gearbox output. The gearbox output is provided with a hexagonal opening into which the hexagonal sleeve is received. The drive shaft is provided with a drive coupling. In the illustrated embodiment the drive coupling comprises an annular axially extending bore having aligned transversely extending apertures passing therethrough. The drive coupling is coupled to a input member of a driven member. In the illustrated embodiment the input member is a spindle of seed meter. The spindle is received in the bore. The spindle is also provided with a transversely extending hole which is aligned with the transversely extending apertures on the drive coupling. A readily releasable pin is inserted through aligned apertures and hole thereby drivingly coupling the drive coupling to the input member. In the illustrated embodiment the readily releasable pin is a spring pin.

BRIEF DESCRIPTION OF THE DRAWINGS

FIG. 1 is a rear perspective view of a seeding machine comprising an individual planting unit.

FIG. 2 is a cross sectional view of the gear box and rotatable drive shaft wherein the drive shaft is in its engaged position.

DETAILED DESCRIPTION

Figure 4:
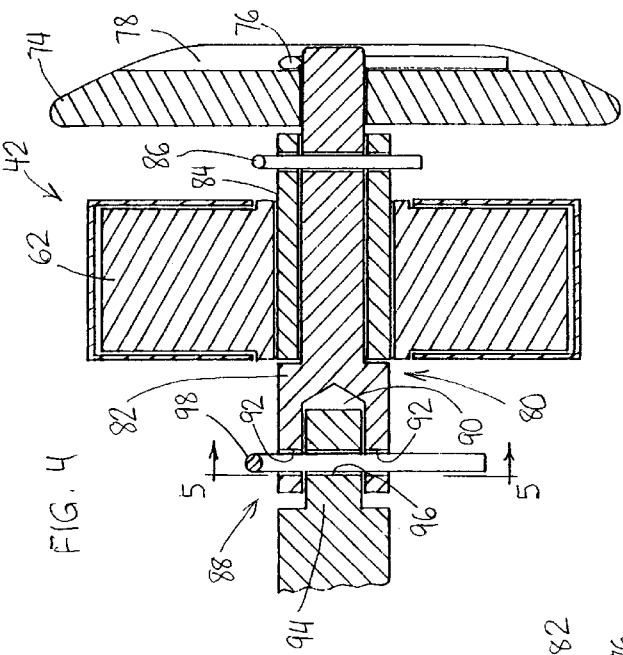
FIG. 4 is a is a cross sectional view of the gearbox, drive element and input member.
Figure 5:
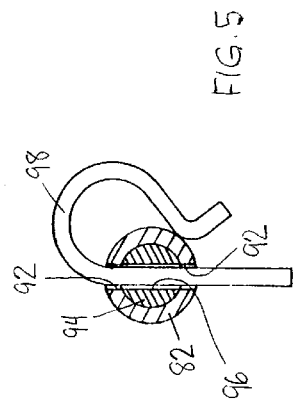
FIG. 5 is a cross sectional view of the spring pin taken along line 5—5 in FIG. 4.
Figure 3:
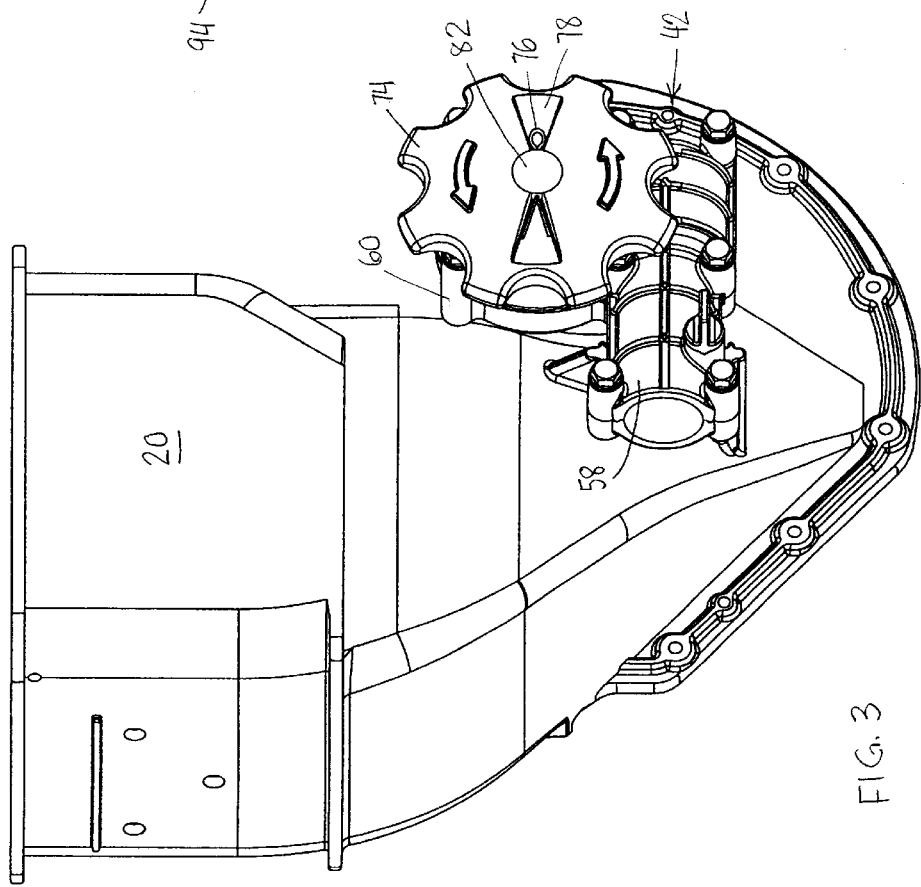
FIG. 3 is a is a close up perspective view of the gearbox.

The seeding machine 10 comprises an individual row crop planting unit that is mounted to a transverse toolbar, not shown, by U-bolts that engage a mounting plate 12. The planting unit is provided with a frame 14 that is coupled to the mounting plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on fame 14. Seed in the auxiliary hopper 20 is metered by a seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30. A forward mounted coulter 32 is used for slicing through crop residue before it encounters the furrow opener 24.

The seed meter 22 is driven by a flexible rotatable drive shaft 40 that drives gear box 42. The flexible and rotatable drive shaft 40 is of a type manufactured and marketed by Elliott Manufacturing Company, LLC of Binghamton, N.Y. A ground driven transmission, not shown, provides a rotational input into the flexible drive shaft 40. In this way the ground speed of the seeding machine 10 controls the speed of the seed meter 22. The flexible rotatable drive shaft 40 comprises a flexible outer sheath and a rotatable inner core. The end of the flexible rotatable drive shaft is provided with a male coupling 44 comprising a ferrule 46 and a faceted rotatable male drive member 48. The ferrule 46 is a metal sleeve having a circumferential groove 50.

The gearbox 42 comprises a housing having a ferrule receiving portion 58 and a gear receiving portion 60. Two helical gears 62 and 64 are mounted in the gear receiving portion 60 of the housing. The first helical gear 62 is drivingly coupled to the seed meter 22 by drive element 80. The second helical gear 64 is drivingly coupled to the first helical gear 62. The second helical gear 64 is provided with a multifaceted bore that receives the male drive member 48 of the flexible rotatable drive shaft 40. When the drive shaft 40 is in its engaged position, illustrated in FIG. 2, the second helical gear 64 is driven by the flexible rotatable drive shaft 40.

The cylindrical ferrule receiving portion 58 is provided with a latch 66 comprising a transverse pin. The pin is rotatively positioned in a transverse bore located on the ferrule receiving portion 58 of the gearbox housing. The pin has a first end with two operator engaging surfaces 72. The pin can be rotated into a latched or unlatched position. To move the pin between positions, the operator engages the operator engaging surfaces 72 and pushes the pin inwardly. The pin is then rotated to the desired position. The pin has a circumferential surface defining a latching position and a recessed section defining a delatching position. In its latching position, the circumferential surface engages the circumferential groove 50 to latch the rotatable drive shaft into its engaged position. In its delatching position, the recessed section frees the ferrule 46 and allows it to slide axially within the ferrule receiving portion 58 of the gearbox housing until it decoupled form the gearbox 42. To facilitate locating the ferrule 46 within the ferrule receiving portion 58 of the gearbox housing, the ferrule maybe provided with visual indicators. When the visual indicator is aligned with the edge of the ferrule receiving portion 58 of the gearbox housing the circumferential groove 50 of the ferrule 46 is correctly axially positioned for engagement by the circumferential surface of the pin.

The drive element 80 comprises a drive shaft 82 on which is mounted a multifaceted sleeve 84. The multifaceted sleeve 84 is pinned to the drive shaft 82 by a cotter pin 86. The cotter pin 86 provides torque protection by defining a torque transmission limit. In the illustrated embodiment the multifaceted sleeve 84 is a hexagonal sleeve.

The hexagonal sleeve is driven by a gearbox output defined by the multifaceted drive opening in gear 62 into which the hexagonal sleeve is received. The drive shaft 82 is provided with a drive coupling 88. In the illustrated embodiment the drive coupling 88 comprises an annular axially extending bore 90 having aligned transversely extending apertures 92 passing therethrough. The drive coupling 88 is coupled to an input member of a driven member. In the illustrated embodiment the input member is a spindle 94 of the seed meter 22. The spindle 94 is received in the bore 90. The spindle 94 is also provided with a transversely extending hole 96 which is aligned with the transversely extending apertures 92 on the drive coupling 88. A readily releasable pin 98 is inserted through aligned apertures 92 and hole 96 thereby drivingly coupling the drive coupling 88 to the input member. In the illustrated embodiment, the readily releasable pin 98 is a spring pin.

An operator knob 74 is drivingly mounted to the drive shaft 82 for manually rotating the gearbox 42. In addition this knob 74 can be used to move the second helical gear so that it registers with the male driving member 48 when it is inserted into the gearbox housing 42. The knob 74 is drivingly coupled to the drive shaft 82 by a cotter pin 76 trapped in channel 78 formed in the outer surface of knob 74.

If an operator needs to disconnect the drive line from the flexible rotatable drive shaft 40 and the seed meter 22, the operator removes the readily releasable pin 98 and then removes the drive element 80 by pulling on the knob 74. The drive element 80 and readily releasable pin 98 can then be stored until the seed meter 22 needs to be reconnected.

Having described the preferred embodiment, it will become apparent that various modifications can be made without departing from the scope of the invention as defined in the accompanying claims.

What is claimed is:

1. A transmission for an agricultural machine, the transmission comprising:
    a gearbox having a gearbox output, the gearbox output is provided with a multifaceted drive opening providing a rotational output;
    a driven member having an input member;
    a drive element extending between the gearbox output and the driven member for transmitting the rotational output from the gearbox to the input member, the drive element having a drive shaft that is provided with a drive coupling for drivingly engaging the input member, a multifaceted sleeve is mounted on the drive shaft and secured thereto, the multifaceted sleeve being received in the multifaceted drive opening and drivingly engaging the gearbox output.

2. A transmission as defined by claim 1 wherein the multifaceted sleeve is secured to the drive shaft by a shear pin that defines a torque transmission limit for the drive element.

3. A transmission as defined by claim 2 wherein the drive coupling comprises an annular axially extending bore on the drive shaft which receives the input member, the input member comprising a spindle, a readily removable pin extends between the drive shaft and the input member for drivingly securing the drive element to the input member.

4. A transmission as defined by claim 3 wherein the drive shaft adjacent to the axially extending bore is provided with two transversely extending apertures and the spindle is provided with a transversely extending hole which is aligned with the transversely extending apertures to receive the readily removable pin.

5. A transmission as defined by claim 4 further comprising a knob that is mounted to the drive element.

6. A transmission as defined by claim 1 wherein the drive coupling comprises an annular axially extending bore on the drive shaft which receives the input member, the input member comprising a spindle, a readily removable pin extends between the drive shaft and the input member for drivingly securing the drive element to the input member.

7. A transmission as defined by claim 6 wherein the drive shaft adjacent to the axially extending bore is provided with two transversely extending apertures and the spindle is provided with a transversely extending hole which is aligned with the transversely extending apertures to receive the readily removable pin.

8. A transmission as defined by claim 7 further comprising a knob that is mounted to the drive element.

9. An agricultural seeding machine for planting a crop, the seeding machine comprising:
    a frame;
    a seed meter is mounted to the frame for metering seed to be planted, the seed meter having an input member;
    a furrow opener is mounted to the frame for forming a seed trench in a field into which metered seed from the seed meter is directed;
    a gearbox is mounted to the frame, the gearbox is driven by a flexible rotatable drive shaft, the gearbox is operatively coupled to the input member of the seed meter by a drive element, the gearbox is provided with a gearbox output having a multifaceted drive opening;
    the drive element comprises a drive shaft having a drive coupling for drivingly engaging the input member, a multifaceted sleeve is mounted on the drive shaft and secured thereto, the multifaceted sleeve being received in the multifaceted drive opening and drivingly engaging the gearbox output.

10. An agricultural seeding machine as defined by claim 9 wherein the multifaceted sleeve is secured to the drive shaft by a shear pin that defines a torque transmission limit for the drive element.

11. An agricultural seeding machine as defined by claim 10 wherein the drive coupling comprises an annular axially extending bore on the drive shaft which receives the input member, the input member comprising a spindle, a readily removable pin extends between the drive shaft and the input member for drivingly securing the drive element to the input member.

12. An agricultural seeding machine as defined by claim 11 wherein the drive shaft adjacent to the axially extending bore is provided with two transversely extending apertures and the spindle is provided with a transversely extending hole which is aligned with the transversely extending apertures to receive the readily removable pin.

13. An agricultural seeding machine as defined by claim 12 further comprising a knob that is rotatively mounted to the drive element.

14. An agricultural seeding machine as defined by claim 9 wherein the drive coupling comprises an annular axially extending bore on the drive shaft which receives the input member, the input member comprising a spindle, a readily removable pin extends between the drive shaft and the input member for drivingly securing the drive element to the input member.

15. An agricultural seeding machine as defined by claim 14 further comprising a knob that is mounted to the drive element.

16. An agricultural seeding machine as defined by claim 15 wherein the multifaceted sleeve is a hexagonal sleeve and the multifaceted drive opening is a hexagonal opening.

17. A drive element for drivingly coupling a gearbox to an input member of an agricultural machine, the drive element comprising:

a drive shaft having a drive coupling, the drive coupling is provided with an annular axially extending bore which receives the input member, the input member comprising a spindle, a readily removable pin extends between the drive shaft and the input member for drivingly securing the drive element to the input member;

a multifaceted sleeve is mounted on the drive shaft and secured thereto, the multifaceted sleeve being received in and drivingly engaging the gearbox, the multifaceted sleeve is secured to the drive shaft by a shear pin that defines a torque transmission limit for the drive element;

a readily removable pin extends between the drive shaft and the input member for drivingly securing the drive element to the input member.

18. A drive element as defined by claim 17 wherein the drive shaft adjacent to the axially extending bore is provided with two transversely extending apertures and the spindle is provided with a transversely extending hole which is aligned with the transversely extending apertures to receive the readily removable pin.

19. A drive element as defined by claim 18 further comprising a knob that is drivingly mounted to the drive element by a cotter pin.

20. A drive element as defined by claim 19 wherein the multifaceted sleeve is a hexagonal sleeve and the multifaceted drive opening is a hexagonal opening.

* * * * *